(12) United States Patent
Mizutani et al.

(10) Patent No.: US 8,085,663 B2
(45) Date of Patent: Dec. 27, 2011

(54) DATA PROCESSING APPARATUS AND DATA PROCESSING METHOD

(75) Inventors: Yuichi Mizutani, Tokyo (JP); Atsushi Makita, Tokyo (JP)

(73) Assignee: Sony Corporation, Tokyo (JP)

( * ) Notice: Subject to any disclaimer, the term of this patent is extended or adjusted under 35 U.S.C. 154(b) by 159 days.

(21) Appl. No.: 12/565,810

(22) Filed: Sep. 24, 2009

(65) Prior Publication Data

US 2010/0080138 A1    Apr. 1, 2010

(30) Foreign Application Priority Data

Sep. 26, 2008 (JP) ................ P2008-247910

(51) Int. Cl.
*G06F 11/00* (2006.01)
*H04N 5/93* (2006.01)

(52) U.S. Cl. ............... 370/230.1; 370/465; 386/353

(58) Field of Classification Search ....... 370/229–230.1, 370/252, 464, 465; 386/263, 353, 356, 357
See application file for complete search history.

(56) References Cited

U.S. PATENT DOCUMENTS 6,034,731 A * 3/2000 Hurst, Jr. ............... 386/330

FOREIGN PATENT DOCUMENTS

| EP | 1 335 604 | 8/2003 |
|---|---|---|
| EP | 1 389 849 | 2/2004 |
| EP | 1 562 381 | 8/2005 |
| EP | 1 821 542 | 8/2007 |
| JP | 2002 152273 | 5/2002 |
| JP | 2005 20072 | 1/2005 |
| JP | 2006 261775 | 9/2006 |
| JP | 2008 22330 | 1/2008 |
| WO | WO 2007 034634 | 3/2007 |

* cited by examiner

*Primary Examiner* — Aung S Moe
*Assistant Examiner* — Kerri Rose
(74) *Attorney, Agent, or Firm* — Frommer Lawrence & Haug LLP; William S. Frommer; Thomas F. Presson

(57) ABSTRACT

A data processing apparatus including: an adjusting section configured to receive a stream including packets and a start flag indicative of the beginning of each of the packets in the stream, adjust a rate of the stream to a certain rate, and output the adjusted stream that is the stream after the rate adjustment and the start flag indicative of the beginning of each of the packets in the adjusted stream; a monitoring section configured to monitor a packet interval that is a start interval between the packets in the adjusted stream on the basis of the start flag; and an output control section configured to execute output control of outputting the packets in the adjusted stream if the packet interval is a normal interval and restricting the outputting of the packets in the adjusted stream if the packet interval is an abnormal interval.

10 Claims, 11 Drawing Sheets

DATA PROCESSING APPARATUS AND DATA PROCESSING METHOD

BACKGROUND OF THE INVENTION

1. Field of the Invention

The present invention relates to a data processing apparatus and a data processing method and, more particularly, to a data processing apparatus and a data processing method that are configured to easily prevent apparatuses from getting in an abnormal state in which these apparatuses operate in an abnormal manner.

2. Description of the Related Art

For example, in a broadcasting station of satellite digital broadcasting, an image (a moving image) and so on are encoded by a predetermined encoding scheme, such as MPEG (Moving Picture Experts Group) or the like, and processing for error correction, such as convolution coding or the like, is executed on a resultant stream TS (Transport Stream). Further, in the broadcasting station, modulation processing, such as digital modulation or the like, is executed and a resultant modulated signal is transmitted as a broadcast signal.

The broadcast signal of satellite digital broadcasting that is transmitted as described above is received by receiving apparatuses, such as a digital TV (Television) and mobile phone. In each receiving apparatus, the received broadcast signal is demodulated and error correction processing is executed on the demodulated signal. Further, in each receiving apparatus, MPEG data (the data encoded by the MPEG scheme) arranged in packets (TS packets) constituting a stream obtained as a result of the error correction processing is decoded and images (and audio) obtained as a result of the decoding are reproduced.

As described above, in the receiving apparatus, an error caused during the transmission of each broadcast signal is corrected by executing error correction processing.

Meanwhile, in poor signal receiving environments, such as an environment in which the power of a broadcast signal to be received by the receiving apparatus is weak and an environment in which the noise included in a broadcast signal is large, for example, an error that cannot be corrected may occur or the demodulation of a broadcast signal may fail.

If an uncorrectable error occurs or the demodulation of a broadcast signal fails, a stream after error correction processing may become short or elongated. If such a stream (or packets constituting the stream) is given to a decoder for decoding MPEG data, the decoder and eventually the receiving apparatus may put in an abnormal state (for example, a hung-up state or a system runaway state) in which the receiving apparatus operates abnormally.

It is important in view of fail safe to prevent the receiving apparatus from getting in an abnormal state. One of prevention methods is the monitoring of PTS (Presentation Time Stamp), for example (refer to, for example, Japanese Patent Laid-Open Nos. 2006-157729 and 2007-012187, hereinafter referred to as Patent Documents 1 and 2).

To be more specific, in MPEG2, if the PTS included in a TS packet is damaged in terms of standard, the processing of the decoder is affected. Therefore, Patent Documents 1 and 2 disclose methods in which, PTS monitoring is executed and, if an abnormal PTS is detected, the corresponding TS packet is prevented from being outputted to the decoder and the abnormal PTS is corrected, thereby preventing the receiving apparatus from getting in an abnormal state.

SUMMARY OF THE INVENTION

In poor receiving environments as described above, if demodulation fails or an uncorrectable error occurs due to synchronization failure, TS packets may become shorter or, conversely, elongated than the standard length, thereby causing TS packets having lengths that do not comply with the standard.

In the above-mentioned case, if there is no abnormal PTS, the above-mentioned PTS monitoring method gives abnormal TS packets having non-standard lengths to the decoder.

Also, in the PTS monitoring method, it is necessary to extract the PTS from each TS packet, thereby increasing the load of processing.

Therefore, the present invention addresses the above-identified and other problems associated with related-art methods and apparatuses and solves the addressed problems by providing an information processing apparatus and an information processing method that easily prevent apparatuses from getting in an abnormal state caused by the outputting of packets of abnormal lengths.

In carrying out the invention and according to a first embodiment thereof, there is provided a data processing apparatus. This data processing apparatus has adjusting means for receiving a stream composed of packets and a start flag indicative of the beginning of each of the packets in the stream, adjusting a rate of the stream to a certain rate, and outputting the adjusted stream that is the stream after the rate adjustment and the start flag indicative of the beginning of each of the packets in the adjusted stream; monitoring means for monitoring a packet interval that is a start interval between the packets in the adjusted stream on the basis of the start flag; and output control means for executing output control of outputting the packets in the adjusted stream if the packet interval is a normal interval and restricting the outputting of the packets in the adjusted stream if the packet interval is an abnormal interval.

In carrying out the invention and according the first embodiment thereof, there is provided a data processing method of the first embodiment of the invention for a data processing apparatus that receives a stream composed of packets and a start flag indicative of the beginning of each of the packets in the stream in order to process the stream. This data processing method has the steps of adjusting a rate of the stream to a certain rate and outputting the adjusted stream that is the stream after the rate adjustment and the start flag indicative of the beginning of each of the packets in the adjusted stream; monitoring a packet interval that is a start interval between the packets in the adjusted stream on the basis of the start flag; and executing output control of outputting the packets in the adjusted stream if the packet interval is a normal interval and restricting the outputting of the packets in the adjusted stream if the packet interval is an abnormal interval.

In the above-mentioned first embodiment, the rate of said stream is adjusted to a certain rate and the adjusted stream that is the stream after the rate adjustment and the above-mentioned start flag indicative of each packet in the above-mentioned adjusted stream are outputted. Further, on the basis of the above-mentioned start flag, the packet interval is monitored that is the start interval between the packets in the adjusted stream. Then, if this packet interval is found to be normal, the packets in the adjusted stream are outputted. If this packet interval is found to be abnormal, the outputting of the packets in the adjusted stream is restricted.

In carrying out the invention and according to a second embodiment thereof, there is provided a data processing apparatus. This data processing apparatus has adjusting means for receiving a stream composed of packets and a start flag indicative of the beginning of each of the packets in the stream, adjusting a rate of the stream to a certain rate, and outputting the adjusted stream that is the stream after the rate adjustment and the start flag indicative of the beginning of each of the packets in the adjusted stream; monitoring means for monitoring a packet interval that is a start interval between the packets in the adjusted stream on the basis of the start flag; output control means for executing output control of outputting the packets in the adjusted stream if the packet interval is a normal interval and restricting the outputting of the packets in the adjusted stream if the packet interval is an abnormal interval; and decoding means for decoding the packets outputted as a result of the output control.

In carrying out the invention and according the second embodiment thereof, there is provided a data processing method of the second embodiment of the invention for a data processing apparatus that receives a stream composed of packets and a start flag indicative of the beginning of each of the packets in the stream in order to process the stream. This data processing method has the steps of adjusting a rate of the stream to a certain rate and outputting the adjusted stream that is the stream after the rate adjustment and the start flag indicative of the beginning of each of the packets in the adjusted stream; monitoring a packet interval that is a start interval between the packets in the adjusted stream on the basis of the start flag; executing output control of outputting the packets in the adjusted stream if the packet interval is a normal interval and restricting the outputting of the packets in the adjusted stream if the packet interval is an abnormal interval; and decoding the packets outputted as a result of the output control.

In the above-mentioned second embodiment of the invention, the rate of the stream is adjusted to a certain rate and the adjusted stream that is the stream after the rate adjustment and the above-mentioned start flag indicative of the beginning of each packet in the above-mentioned adjusted stream are outputted. Further, on the basis of the above-mentioned start flag, the packet interval is monitored that is the start interval between the packets in the adjusted stream. Then, if this packet interval is found to be normal, the packets in the adjusted stream are outputted. If this packet interval is found to be abnormal, the outputting of the packets in the adjusted stream is restricted. Then, the above-mentioned packets outputted as a result of the above-mentioned execution of the output control are decoded.

It should be noted that the data processing apparatus may be a standalone unit or an interval block that makes up one unit.

The first and second embodiments of the present invention can easily prevent apparatuses from getting in an abnormal state.

DETAILED DESCRIPTION OF THE PREFERRED EMBODIMENTS

The invention will be described in further detail by way of embodiments thereof with reference to the accompanying drawings.

<An Exemplary Configuration of a Receiving System to Which the Present Invention is Applied>

Figure 1:
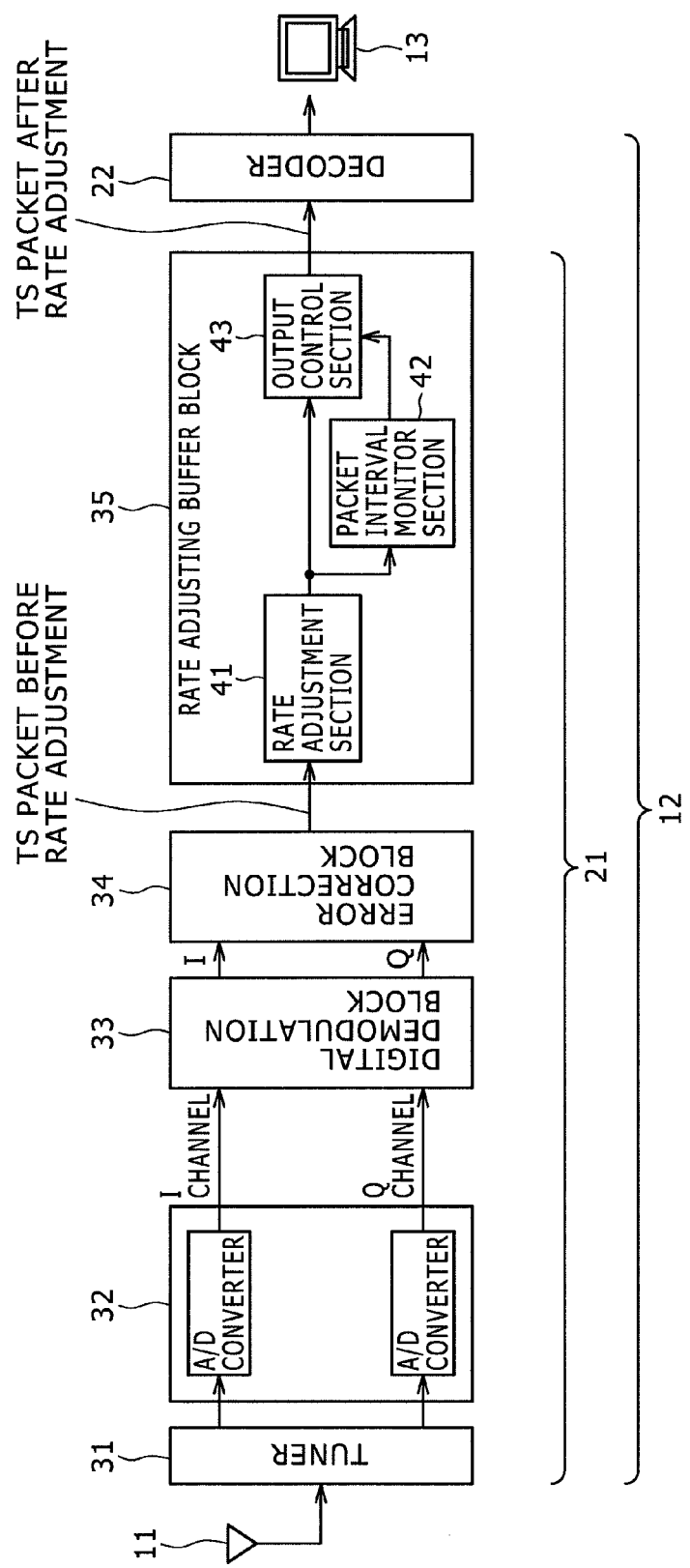
FIG. 1 is a block diagram illustrating an exemplary configuration of a receiving apparatus system practiced as one embodiment of the invention.

Now, referring to FIG. 1, there is shown a block diagram illustrating an exemplary configuration of a receiving system (a system denotes a logical set of two or more apparatuses whether these apparatuses are arranged in one housing or not) practiced as one embodiment of the invention.

In FIG. 1, the receiving system is made up of an antenna 11, a receiving apparatus 12, and a monitor 13, which is applied to a TV (a television receiver) for example.

In the receiving system, broadcast signals transmitted from a broadcasting station of satellite digital broadcasting are processed.

To be more specific, in a broadcasting station of satellite digital broadcasting, images (moving images) and so on are encoded by a predetermined encoding scheme, such as MPEG, and error correction processing, such as convolution coding, and so on are executed on a resultant TS. Further, in the broadcasting station, modulation processing, such as digital modulation, is executed and a modulated signal obtained as a result of this processing is transmitted as a broadcast signal.

The antenna 11 receives broadcasting signals transmitted as described above and RF (Radio Frequency) signals obtained as a result of the reception are supplied to the receiving apparatus 12.

The receiving apparatus 12, made up of a demodulation processing block 21 and a decoder 22, processes an RF signal from the antenna 11 and supplies an image (or a moving image) obtained as a result of this processing to the monitor 13.

The demodulation processing block 21, made up of a tuner 31, an A/D (Analog/Digital) conversion block 32, a digital demodulation block 33, an error correction block 34, and a rate adjusting buffer block 35, executes demodulation processing on RF signals supplied from the antenna 11.

The tuner 31 converts an RF signal supplied from the antenna 11 into an IF (Intermediate Frequency) signal and extracts an I component (in-phase) and a Q component (orthogonal component) of a signal of a predetermined channel in accordance with a user operation or the like from the converted IF signal, supplying the extracted components to the A/D conversion block 32.

The A/D conversion block 32 executes A/D conversion on the I component and the Q component (the signal including these components) supplied from the tuner 31 and supplies the converted components to the digital demodulation block 33.

The digital demodulation block 33 digitally demodulates the I component and the Q component supplied from the A/D conversion block 32 and supplies the digitally demodulated I component and Q component to the error correction block 34.

By use of the I component and the Q component supplied from the digital demodulation block 33, the error correction block 34 executes the error correction processing for decoding an error correction code, such as Viterbi decoding or Reed-Solomon decoding, and supplies the TS obtained as a result of this error correction processing to the rate adjusting buffer block 35 along with a start flag and a valid flag.

Here, the error correction block 34 detects the beginning of the error correction code to execute the error correction processing for decoding that error correction code. The error correction code of one code length is equivalent to one or more integral number of TS packets and the beginning of the error correction code of one code length is equivalent to the beginning of each TS packet.

The error correction block 34 decodes the error correction code of one code length into one or more integral number of TS packets equivalent to that error correction code of one code length and supplies the start flag indicative of the beginning of each TS packet to the rate adjusting buffer block 35 along with the TS that is a string of TS packets after the coding (the error correction processing).

Also, the error correction block 34 supplies the valid flag indicative of a valid section that is a section of the TS successful in the decoding of the error correction code to the rate adjusting buffer block 35 along with the TS.

The rate adjusting buffer block 35 receives, from the error correction block 34, the TS and the start flag and valid flag thereof from the error correction block 34 and adjusts the rate (speed) of the TS to a certain rate (the rate of the TS of the broadcasting station side, for example) compliant with the standard of satellite digital broadcasting. Then, the rate adjusting buffer block 35 supplies the TS packets making up the adjusted TS that is the TS after the rate adjustment to the decoder 22.

To be more specific, the rate adjusting buffer block 35 is made up of a rate adjustment section 41, a packet interval monitor section 42 and an output control section 43.

The rate adjustment section 41 receives the TS, the start flag, and the valid flag from the error correction block 34 and adjusts the rate (speed) of the TS to a certain rate compliant with the standard of satellite digital broadcasting. Further, in addition to the adjustment of the rate of the TS, the rate adjustment section 41 adjusts the start flag and the valid flag supplied from the error correction block 34. Then, the rate adjustment section 41 outputs the adjusted TS that is the TS after the rate adjustment, the start flag indicative of the beginning of the TS packet in the adjusted TS, and the valid flag indicative of the valid interval of the adjusted TS.

The adjusted TS, the start flag, and the valid flag outputted from the rate adjustment section 41 are supplied to the output control section 43. Further, the start flag outputted from the rate adjustment section 41 is also supplied to the packet interval monitor section 42.

On the basis of the start flag supplied from the rate adjustment section 41, the packet interval monitor section 42 measures the time (interval) from the start flag to a next start flag at maximum by use of a timer or the like to monitor the packet interval that is the interval between the TS packets in the adjusted TS. Then, the packet interval monitor section 42 supplies an interval signal indicative whether the packet interval is normal or abnormal to the output control section 43.

On the basis of the interval signal supplied from the packet interval monitor section 42, the output control section 43 determines (or recognizes) whether the packet interval is normal or abnormal. On the basis of this determination, the output control section 43 executes output control for controlling the outputting of the adjusted TS supplied from the rate adjustment section 41.

To be more specific, if the packet interval is found to be normal, the output control section 43 outputs the TS packets in the adjusted TS; if the packet interval is found to be abnormal, the output control section 43 restricts the outputting of the TS packets in the adjusted TS.

The TS packets outputted from the output control section 43 are supplied to the decoder 22.

It should be noted that the output control section 43 also supplies the start flag and the valid flag to the decoder 22 in addition to the TS packets. In the output control by the output control section 43, the outputting of the start flag and the valid flag is also controlled in addition to the adjusted TS.

The decoder 22 decodes, on the basis of the MPEG scheme, the TS packets supplied from the output control section 43 of the rate adjusting buffer block 35 and supplies an image obtained as a result of this decoding to the monitor 13. It should be noted that an audio signal is also obtained by the decoder 22, which is supplied to a loudspeaker, not shown, for sounding.

The monitor 13 is made up of an LCD (Liquid Crystal Display) or an organic EL (Electro Luminescence) display, for example, and displays the image received from the decoder 22.

It should be noted that, the demodulation processing block 21 may be configured by one IC (Integrated Circuit), for example.

<Description of the Output of the Error Correction Block 34 to be Supplied to the Rate Adjusting Buffer Block 35>

Figure 2:
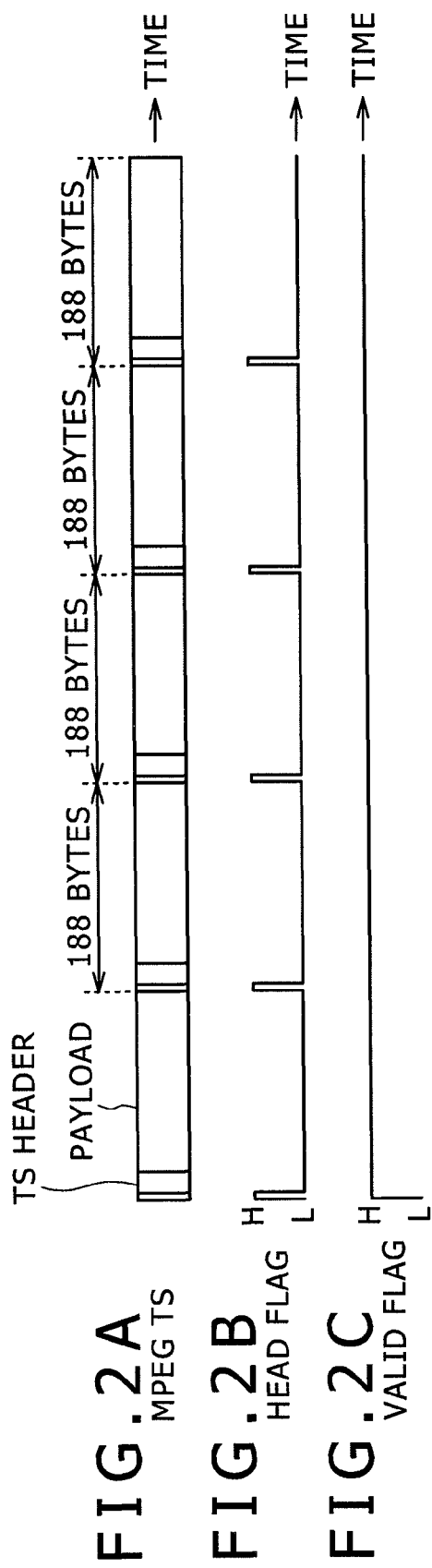
FIGS. 2A to 2C are diagrams for describing an output of an error correction block.

Referring to FIGS. 2A to 2C, there is shown the output of the error correction block 34 to be supplied to the rate adjusting buffer block 35 shown in FIG. 1.

As described with reference to FIG. 1, the error correction block 34 outputs a TS and the start flag and the valid flag of the TS to the rate adjusting buffer block 35.

FIG. 2A shows an (ideal) TS that is outputted by the error correction block 34.

A TS is a string of 188 byte TS packets. Each TS packet is configured by a TS header and a payload in this order from the beginning.

It should be noted that, in FIG. 2A, the TS is shown with the rate of TS packet being a constant rate for the brevity of illustration. Therefore, in FIG. 2A, the interval between TS packets is constant in time. It should be noted, however, that the rate of the TS to be outputted from the error correction block 34 is not always constant.

FIG. 2B shows the (ideal) start flag to be outputted from the error correction block 34.

Of H (High) and L (Low) levels, the start flag is at H level (or level 1) at the beginning of each TS packet and L level (level 0) at other points of time.

FIG. 2C shows an (ideal) valid flag to be outputted from the error correction block 34.

Of the H and L levels, the valid flag goes H level in a TS section in which the decoding of the error correction code is successful (hereafter referred to as a valid section) and L level in a TS section in which the decoding of the error correction code is unsuccessful (or a section other than the valid section), for example.

<Description of TS Format>

Figure 3:
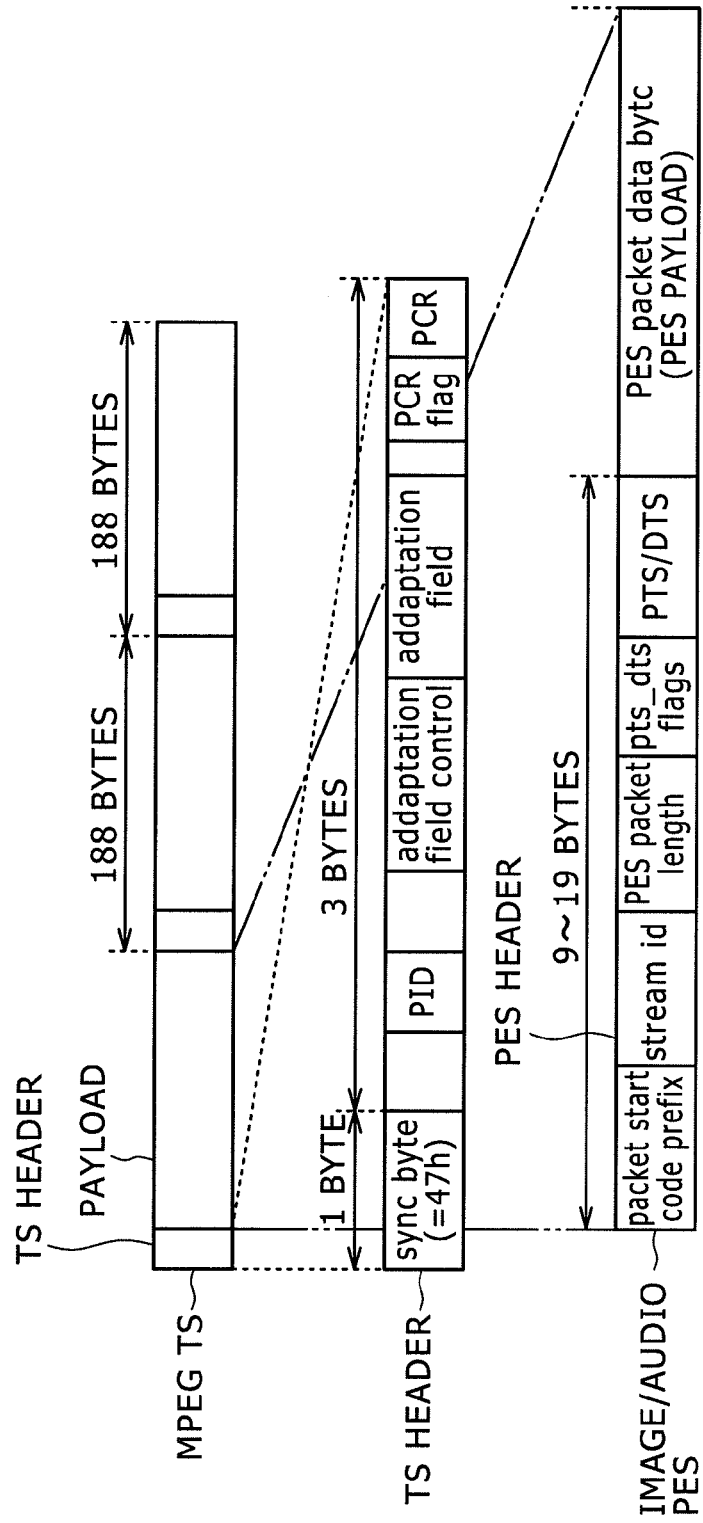
FIG. 3 is a diagram for describing a TS format.

Referring to FIG. 3, there is shown a format of a TS that is outputted from the error correction block 34.

A TS is a string of 188 bytes TS packets as described with reference to FIG. 2A. Each TS packet is made up of a TS header and a payload in this order from the beginning.

The TS header is made up of one-byte sync byte for synchronization and three-byte data in this order.

In the TS, the sync byte is 0x47 (0x indicative that the following value is in hexadecimal notation).

The three-byte data following the sync byte includes PID (Packet ID (Identification)) and adaptation field control.

PID is indicative of the type (or the attribute) of the data in the payload. Adaptation field control is indicative of the presence of an adaptation field and so on.

An adaptation field includes PCR (Program Clock Reference) and so on.

PCR is a time stamp based on 27 MHz clock and used for the synchronization of the decoder 22 (FIG. 1).

The payload contains 184-byte data for example obtained by dividing a PES (Packetized Elementary Stream) packet, for example.

In FIG. 3, the PES packet (or a part thereof) arranged in the payload is made up of a PES header and a PES payload (or PES packet data bytes) in this order.

The PES header is data of 9 to 19 bytes including packet start code prefix, stream id, PES packet length, PTS (Presentation Time Stamp), and DTS (Decoding Time Stamp).

Packet start code prefix is indicative of the beginning of the PES payload and takes a fixed value of 0x000001. Stream id is indicative of the contents (or an attribute) of the PES payload. PES packet length is indicative of the packet length of the PES packet. PTS is indicative of a display time and DTS is indicative of a decoding time. PTS/DTS occupies 0, 5, or 10 bytes depending on the value of pts_dts_flags.

The PES payload is MPEG data (the data encoded by the MPEG scheme).

<Description of Processing of the Rate Adjusting Buffer Block 35>

Figure 4:
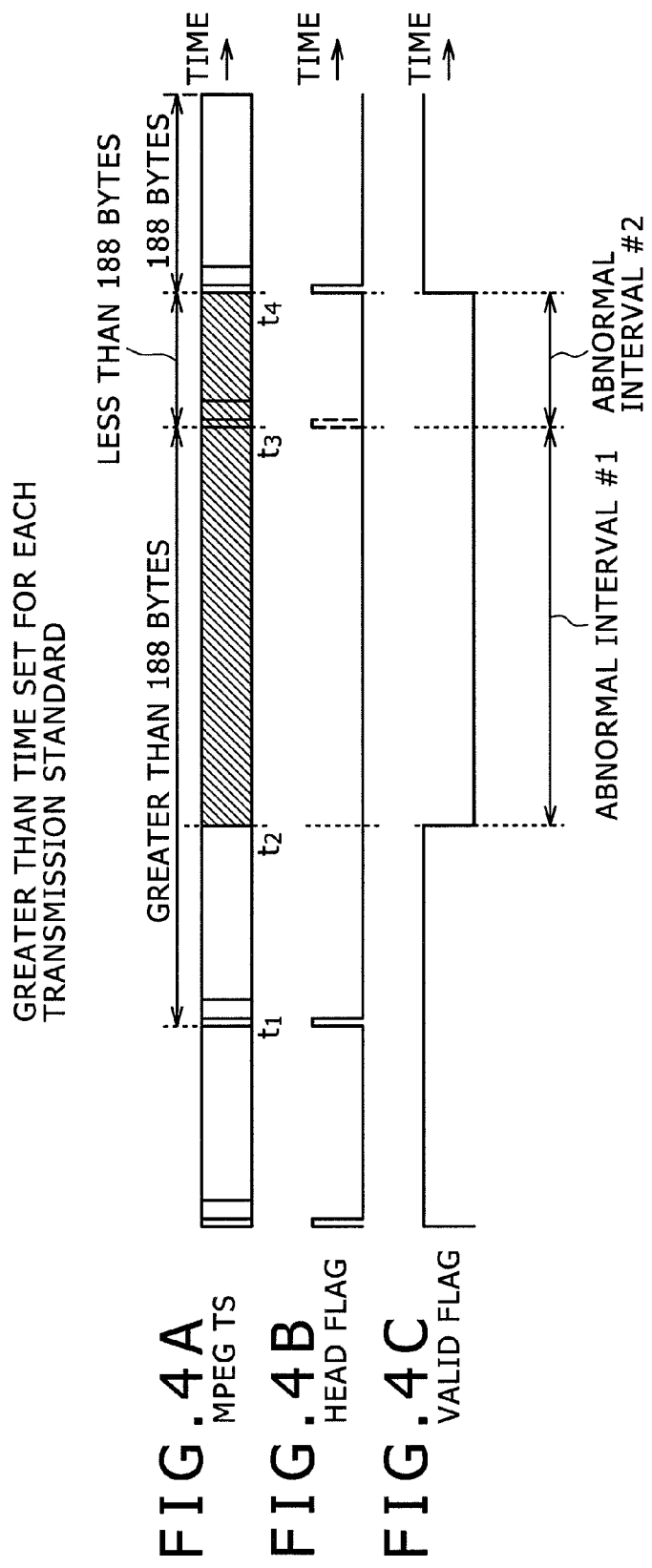
FIGS. 4A to 4C are diagrams for describing processing of a rate adjusting buffer block.

The following describes the processing of the rate adjusting buffer block 35 shown in FIG. 1 with reference to FIGS. 4A to 4C.

FIG. 4A shows the adjusted TS that is outputted by the rate adjustment section 41 of the rate adjusting buffer block 35.

In FIG. 4A, because the receiving system shown in FIG. 1 is in a poor receiving environment, normal synchronization cannot be provided in the digital demodulation in the digital demodulation block 33 (FIG. 1) or the error correction cannot be done in the error correction processing (the decoding of error correction code) in the error correction block 34 (FIG. 1), for example. Consequently, TS packets having fairly longer packet intervals than the normal interval derived from the standard of satellite digital broadcasting are contained in the adjusted TS.

Further, in FIG. 4A, because the receiving environment is poor, the data of the TS is disrupted halfway. Consequently, TS packets having packet intervals shorter than the normal interval are contained in the adjusted TS.

To be more specific, in FIG. 4A, times $t_1$, $t_3$, and $t_4$ are start timings of consecutive TS packets.

The interval between times $t_1$ and $t_3$ is longer than the normal interval and the interval between times $t_3$ and time $t_4$ is shorter than the normal interval.

To be more specific, in the adjusted TS shown in FIG. 4A, there are a longer interval between times $t_1$ and $t_3$ and an immediately following shorter interval between times $t_3$ and $t_4$ as abnormal intervals.

FIG. 4B shows a start flag that is outputted by the rate adjustment section 41 along with the adjusted TS shown in FIG. 4A.

In FIG. 4B, the start flag is at H level indicative of the beginning of the TS packet at times $t_1$, $t_3$, and $t_4$ and at L level at other timings.

On the basis of the start flag outputted by the rate adjustment section 41, the packet interval monitor section 42 counts a time from each start flag (the start flag at H level) (at maximum) to a next start flag (the start flag at the next H level) as a packet interval. Further, the packet interval monitor section 42 outputs an interval signal indicative whether the packet interval is normal or abnormal to the output control section 43.

In FIG. 4B, because a time from the start flag of time $t_1$ to time $t_3$ of the next start flag is longer than the normal interval, the next start flag (the start flag at time $t_3$) will not appear when the normal interval time has passed as the packet interval of 188 bytes packets from the start flag at time $t_1$.

Hence, the packet interval monitor section 42 uses, as the start point, time $t_2$ at which the normal interval time has passed from the start flag of time $t_1$ as the packet interval and uses the TS section with the end point thereof being time $t_3$ of the next start flag as the abnormal section in which the packet interval is abnormal, thereby supplying, to the output control section 43, an interval signal (hereafter also referred to as an abnormal interval signal) indicative that the packet interval is abnormal.

In FIGS. 4A to 4C, the abnormal TS section with time $t_2$ being the start point and time $t_3$ of the next start flag being the end point is also referred to as abnormal section #1.

Further, in FIG. 4B, because the time from the start flag of time $t_3$ to time $t_4$ of the next start flag is shorter than the normal interval, the next start flag (the start flag of time $t_4$) appears before the normal interval time has been reached as the packet interval of the 188 bytes TS packets from the start flag at $t_3$.

Hence, the packet interval monitor section 42 supplies, to the output control section 43, an abnormal interval signal in the abnormal section which is the TS section from the start flag of time $t_3$ to time $t_4$ of the next start flag as the end point, for example.

In FIGS. 4A to 4C, the TS section from the start flag of time $t_3$ to time $t_4$ of the next start flag as the end point is also referred to abnormal section #2.

In FIGS. 4A to 4C, the entirety of abnormal sections #1 and #2 provides a continuous abnormal section.

If the interval signal supplied from the packet interval monitor section 42 is indicative that the packet interval is normal (hereafter, the interval signal in this case is also referred to as a normal interval signal), the output control section 43 outputs the TS packets, the start flag, and the valid flag constituting the adjusted TS outputted from the rate adjustment section 41 to the decoder 22 without change.

On the other hand, if the interval signal supplied from the packet interval monitor section 42 is an abnormal interval signal, executes output restriction processing of restricting the outputting of the TS packets in the abnormal section corresponding to the abnormal interval signal in the adjusted TS supplied from the rate adjustment section 41.

To be more specific, the output control section 43 discards the data (the data of the part of the abnormal section) in the abnormal section in the adjusted TS, for example, as the output restriction processing. It should be noted that this data discarding processing includes outputting of level-0 data besides not outputting the data to the decoder 22.

Also, the output control section 43 executes output restriction processing in which a null packet specified by MPEG is outputted to the decoder 22 as the safe data that does not harm the decoder 22 as the data in the abnormal section in the adjusted TS.

Further, for the abnormal section, the output control section 43 changes the start flag and the valid flag outputted from the rate adjustment section 41 and outputs the changed flags to the decoder 22.

To be more specific, FIG. 4B also shows the start flag that is outputted by the output control section 43 to the decoder 22 by changing the start flag supplied from the rate adjustment section 41.

At the start flag supplied from the rate adjustment section 41, the output control section 43 changes the H-level portion indicative of the start of the TS packet to L level and outputs the changed start flag to the decoder 22.

Here, the start flag shown in FIG. 4B is at H level at time T3 internal to consecutive abnormal sections #1 and #2 (indicted by dashed lines in the figure). The output control section 43 outputs the start flag with H level changed to L level to the decoder 22.

FIG. 4C shows the valid flag with which the output control section 43 changes the valid flag supplied from the rate adjustment section 41 and outputs the changed valid flag to the decoder 22.

The output control section 43 changes the level of the abnormal section of the valid flag supplied from the rate adjustment section 41 to L level and outputs the changed valid flag to the decoder 22.

It should be noted that, in FIGS. 4A to 4C, the start point of abnormal section #1 is not time $t_2$ at which the normal interval time as the packet interval has passed from the start flag of time $t_1$, but may be time $t_1$ of the immediately preceding start flag.

Also, the output control section 43 waits at least a normal interval time as a packet interval from the start flag and then outputs the TS packet in the TS section from the start flag to the next start flag to the decoder 22.

<First Embodiment of Packet Output Processing by the Rate Adjusting Buffer Block 35>

Figure 5:
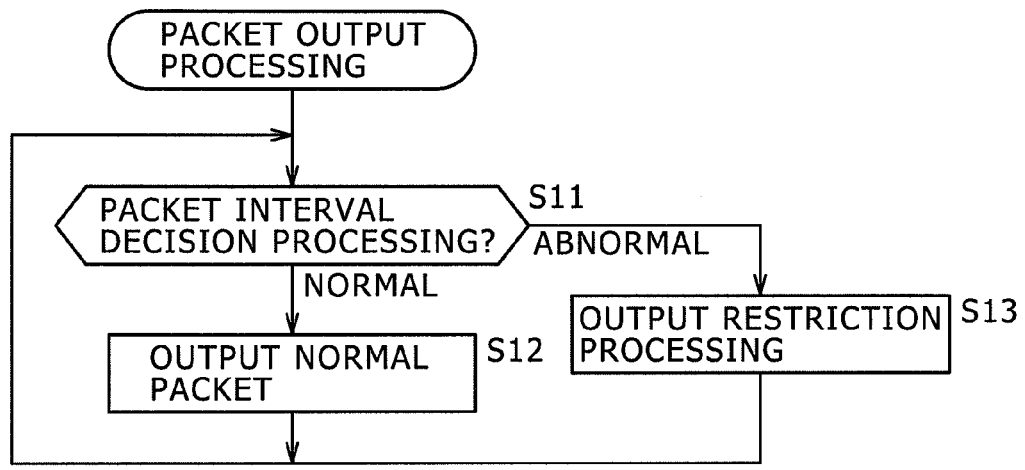
FIG. 5 is a flowchart indicative of a first embodiment of packet output processing by the rate adjusting buffer block.

Now, referring to FIG. 5, the following describes packet output processing (the first embodiment of packet output processing) to be executed by the rate adjusting buffer block 35 shown in FIG. 1 for adjusting the rate of the TS supplied from the error correction block 34 and outputting the TS packets constituting the adjusted TS that is the TS after this rate adjustment to the decoder 22.

The rate adjustment section 41 receives the TS, the start flag, and the valid flag from the error correction block 34, adjusts the TS rate to a certain rate compliant with the standard of satellite digital broadcasting, and outputs the adjusted TS that is the TS after the rate adjustment.

Further, in accordance with the adjustment of the TS rate from the error correction block 34, the rate adjustment section 41 likewise adjusts the timing of the start flag and the valid flag from the error correction block 34, thereby generating the start flag indicative of the beginning of the TS packet in the adjusted TS and the valid flag indicative of the valid section of the adjusted TS.

Then, the rate adjustment section 41 outputs the start flag indicative of the beginning of the TS packet in the adjusted TS and the valid flag indicative of the valid section of the adjusted TS along with the adjusted TS.

The adjusted TS, the start flag, and the valid flag outputted from the rate adjustment section 41 are supplied to the output control section 43. Further, the start flag outputted from the rate adjustment section 41 is also supplied to the packet interval monitor section 42.

On the basis of the start flag supplied from the rate adjustment section 41, the packet interval monitor section 42 counts a time (or an interval) from the start flag to the next start flag at maximum with a timer or the like, thereby monitoring the packet interval that is the interval between the starts of the TS packets in the adjusted TS.

Next, in step S11, the packet interval monitor section 42 executes packet interval decision processing of determining whether the packet inertial is normal or abnormal.

If the packet interval is found to be normal in the packet interval decision processing executed in step S11, then the packet interval monitor section 42 supplies an interval signal (a normal interval signal) indicative that the packet interval is normal to the output control section 43, upon which the procedure goes to step S12.

In step S12, in accordance with the normal interval signal supplied from the packet interval monitor section 42, the output control section 43 outputs the TS packets in the normal interval section, the start flag and the valid flag of that interval of the adjusted TS outputted from the rate adjustment section 41 to the decoder 22 (FIG. 1) without change.

Then, the procedure returns from step S12 to step S11 to repeat the above-mentioned processing therefrom.

If the packet interval is found to be abnormal in the packet interval decision processing of step S11, then the packet interval monitor section 42 supplies an interval signal (an abnormal interval signal) indicative that the packet interval is abnormal to the output control section 43, upon which the procedure goes to step S13.

In step S13, in accordance with the abnormal interval signal supplied from the packet interval monitor section 42, the output control section 43 executes output restriction processing for restricting the outputting of the section (the abnormal section) of the abnormal packet interval of the adjusted TS outputted from the rate adjustment section 41.

To be more specific, in the output restriction processing, the output control section 43 discards the data of the abnormal section in the adjusted TS or outputs a null packet to the decoder 22 as the data of the abnormal section in the adjusted TS.

Further, in the output restriction processing, the start flag and the valid flag outputted from the rate adjustment section 41 are changed for the abnormal section.

To be more specific, at the start flag supplied from the rate adjustment section 41, the output control section 43 changes the H-level portion indicative of the beginning of the TS packet to L level and outputs the changed start flag to the decoder 22.

Further, the output control section 43 changes the level of the abnormal section of the valid flag supplied from the rate adjustment section 41 to L level and outputs the changed valid flag to the decoder 22.

Next, the procedure returns from step S13 to step S11 to repeat the above-mentioned processing therefrom.

As described above, the rate adjusting buffer block 35 receives the TS and the start flag thereof from the error correction block 34, adjusts the rage of the TS to a certain rate, and outputs the adjusted TS obtained by this rate adjustment and the start flag of the adjusted TS.

Further, on the basis of the start flag of the adjusted TS, the rate adjusting buffer block 35 monitors the start packet interval between the TS packets in the adjusted TS (step S11) and, if the packet interval is found to be normal, outputs the TS packets in the adjusted TS; if the packet interval is found to be abnormal, the rate adjusting buffer block 35 executes output control for restricting the outputting of the TS packets in the adjusted TS (steps S12 and S13).

Therefore, the outputting of packets having an abnormal length can easily prevent the apparatus from getting in an abnormal state.

To be more specific, giving TS packets having an abnormal length to the decoder 22 can easily prevent the decoder 22 and then the receiving block 12 from getting in an abnormal state by monitoring the packet interval with the start flag.

Further, even if the PTS is found to be normal, an abnormal TS packet having a length not compliant with the standard is given to the decoder 22, thereby preventing the decoder 22 and so on from getting in an abnormal state.

As described above, the concept of fail safe can easily be realized.

It should be noted that the start flag and the valid flag outputted from the output control section 43 of the rate adjusting buffer block 35 are used as required in the decoder 22. How the decoder 22 uses the start flag and the valid flag depends on the specifications of the decoder 22.

<First Example Configuration of the Output Control Section 43>

Figure 6:
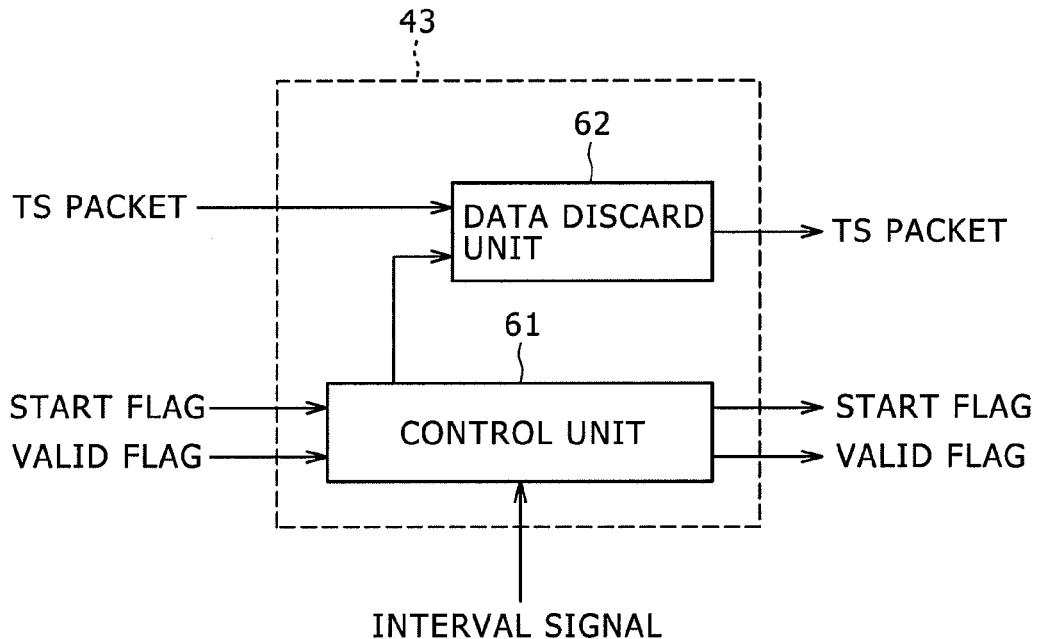
FIG. 6 is a block diagram illustrating a first exemplary configuration of an output control section.

FIG. 6 shows a first example configuration of the output control section 43 shown in FIG. 1.

In FIG. 6, the output control section 43 is made up of a control unit 61 and a data discard unit 62.

The control unit 61 is supplied with a start flag and a valid flag outputted from the rate adjustment section 41 (FIG. 1) and an interval signal outputted from the packet interval monitor section 42.

In accordance with an interval signal supplied from the packet interval monitor section 42, the control unit 61 outputs the start flag and the valid flag supplied from the rate adjustment section 41 to the decoder 22 without change or by changing these flags.

Also, in accordance with an interval signal supplied from the packet interval monitor section 42, the control unit 61 controls the data discard unit 62.

The data discard unit 62 is supplied with the TS packets constituting the adjusted TS outputted from the rate adjustment section 41.

Under the control of the control unit 61, the data discard unit 62 outputs the TS packets constituting the adjusted TS supplied from the rate adjustment section 41 to the decoder 22 without change or discards these TS packets.

<Second Embodiment of Packet Output Processing by the Rate Adjusting Buffer Block 35>

Figure 7:
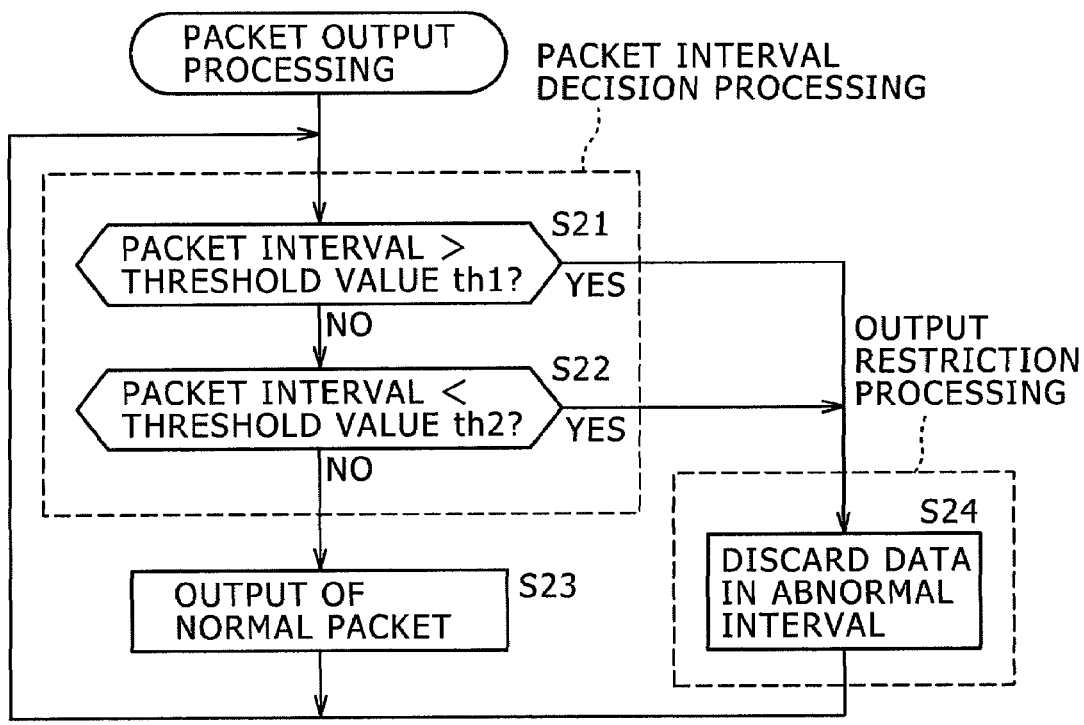
FIG. 7 is a flowchart indicative of a second embodiment of packet output processing by the rate adjusting buffer block.

Referring to FIG. 7, the following describes one embodiment of the packet output processing by the rate adjusting buffer block 35 (the second embodiment of the packet output processing) when the output control section 43 is configured as shown in FIG. 6.

As described above with reference to FIG. 5, the rate adjustment section 41 outputs the adjusted TS, the start flag, and the valid flag. These TS, start flag, and valid flag outputted from the rate adjustment section 41 are supplied to the output control section 43. Further, the start flag outputted by the rate adjustment section 41 is also supplied to the packet interval monitor section 42.

Further, on the basis of the start flag supplied from the rate adjustment section 41, the packet interval monitor section 42 also monitors the packet interval for the adjusted TS as described with reference to FIG. 5.

Then, in step S21, the packet interval monitor section 42 determines whether the packet interval is greater than upper threshold value th1 that can be regarded as normal.

In step S21, if the packet interval is found not to be greater than upper threshold value th1, the procedure goes to step S22, in which the packet interval monitor section 42 determines whether the packet interval is less than lower threshold value th2 (<th1) that is regarded as normal.

In step S22, if the packet interval is found not to be less than lower threshold value th2, then the packet interval monitor section 42 recognizes that the packet interval is normal and supplies a normal interval signal to the output control section 43, upon which the procedure goes to step S23.

In step S23, in accordance with the normal interval signal supplied from the packet interval monitor section 42, the output control section 43 outputs the TS packets of the section in which the packet interval is normal, the start flag, and the valid flag in that section to the decoder 22 (FIG. 1) without change.

To be more specific, in the output control section 43 (FIG. 6), in accordance with the normal interval signal supplied from the packet interval monitor section 42, the control unit 61 controls the data discard unit 62 to output the TS packets in the section in which the packet interval is normal of the adjusted TS supplied from the rate adjustment section 41 to the decoder 22.

Further, in accordance with the normal interval signal supplied from the packet interval monitor section 42, the control unit 61 outputs the start flag and the valid flag supplied from the rate adjustment section 41 to the decoder 22 without change.

Next, the procedure returns from step S23 to step S21 to repeat the above-mentioned processing therefrom.

On the other hand, if the packet interval is found to be greater than upper threshold value th1 in step S21 and the packet interval is found to be less than lower threshold value th2 in step S22, the packet interval monitor section 42 recognizes that the packet interval is abnormal and supplies an abnormal interval signal to the output control section 43, upon which the procedure goes to step S24.

In step S24, in accordance with the abnormal interval signal supplied from the packet interval monitor section 42, the output control section 43 discards the data of the abnormal section in the adjusted TS outputted from the rate adjustment section 41.

Further, in step S24, at the start flag supplied from the rate adjustment section 41, the output control section 43 changes the H-level portion indicative of the start of the TS packet to L level in the abnormal section and outputs the changed start flag to the decoder 22.

Also, the output control section 43 changes the level of the abnormal section of the valid flag supplied from the rate adjustment section 41 to L level and outputs the changed valid flag to the decoder 22.

To be more specific, in the output control section 43 (FIG. 6), in accordance with the abnormal interval signal supplied from the packet interval monitor section 42, the control unit 61 controls the data discard unit 62 to discard the TS packets (data) of the section of the abnormal packet interval of the adjusted TS supplied from the rate adjustment section 41.

Further, in accordance with the abnormal interval signal supplied from the packet interval monitor section 42, the control unit 61 changes the start flag and the valid flag supplied from the rate adjustment section 41 as described above and outputs the changed start flag and valid flag to the decoder 22.

Then, the procedure returns from step S24 to step S21 to repeat the above-mentioned processing therefrom.

According to the packet output processing shown in FIG. 7, monitoring only the packet interval by means of the start flag can easily prevent the decoder 22 and so on from getting in an abnormal state by giving the TS packets having an abnormal length to the decoder 22.

It should be noted that, in FIG. 7, the processing operations of steps S21 and S22 correspond to the packet interval decision processing of step S11 shown in FIG. 5 and the processing operation of step S24 to the output control processing of step S13 shown in FIG. 5.

For upper threshold value th1, a value can be used that is greater, by a predetermined value, than an interval (hereafter also referred to as a specified interval) that is normal as the packet interval derived from the standard of the broadcasting in which broadcast signals are received by the system shown in FIG. 1. Likewise, for lower threshold th2, a value smaller than the specified interval by a predetermined value may be used.

For example, with the Japanese BS (Broadcasting Satellite) digital broadcasting, the specified interval is approximately 1.3 milliseconds.

Upper threshold value th1 and lower threshold value th2 may be in accordance with the broadcasting in which broadcast signals are received by the receiving system shown in FIG. 1. Depending on the broadcasting, the normal interval as a packet interval may differ from channel to channel; in this case, upper threshold value th1 and lower threshold value th2 may be set in accordance with the normal interval as the packet interval on each channel. In addition, upper threshold value th1 and lower threshold value th2 may be set or adjusted in accordance with user operations.

It should be noted that, when the output control section 43 discards data, no special problem is caused if that data includes undamaged PTS.

<Third Embodiment of Packet Output Processing by the Rate Adjusting Buffer Block 35>

Figure 8:
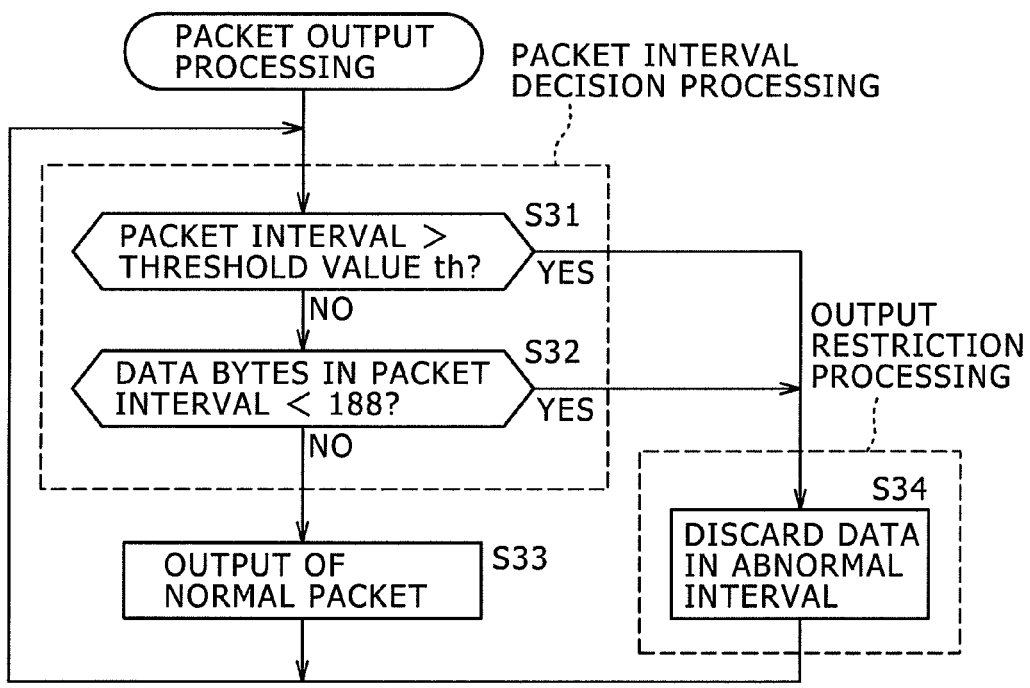
FIG. 8 is a flowchart indicative of a third embodiment of packet output processing by the rate adjusting buffer block.

Referring to FIG. 8, the following describes another embodiment (the third embodiment of the packet output processing) of the packet output processing by the rate adjusting buffer block 35 when the output control section 43 is configured as shown in FIG. 6.

As shown in FIG. 5, the rate adjustment section 41 outputs an adjusted TS, a start flag, and a valid flag. The adjusted TS, the start flag, and the valid flag outputted by the rate adjustment section 41 are supplied to the output control section 43. Further, the start flag outputted from the rate adjustment section 41 is also supplied to the packet interval monitor section 42.

Further, as shown in FIG. 5, the packet interval monitor section 42 also monitors the packet interval of the adjusted TS on the basis of the start flag supplied from the rate adjustment section 41.

Then, in step S31, the packet interval monitor section 42 determines whether the packet interval is greater than threshold value th that is a normal interval.

If the packet interval is found to be not greater than threshold value th in step S31, then the procedure goes to step S32, in which the packet interval monitor section 42 determines the number of bytes of the data in the section of the packet interval determined not greater than threshold value th in step S31 is smaller than 188 bytes that are the size of each TS packet.

If the number of bytes of the data in the section of the packet interval found not greater than threshold value th is found to be not smaller than 188 bytes in step S32, then the packet interval monitor section 42 recognizes that the packet interval found not greater than threshold value th is a normal interval and supplies a normal interval signal to the output control section 43, upon which the procedure goes to step S33.

In step S33, as with step S23 shown in FIG. 7, in accordance with the normal interval signal supplied from the packet interval monitor section 42, the output control section 43 outputs the TS packets in the section of the normal packet interval of the adjusted TS outputted by the rate adjustment section 41, and the start flag and the valid flag of that section to the decoder 22 (FIG. 1) without change.

Next, the procedure returns from step S33 to step S31 to repeat the above-mentioned processing therefrom.

On the other hand, if the packet interval is found to be greater than threshold value th in step S31, then the packet interval monitor section 42 recognizes that this is an abnormal interval because of the too long packet interval and supplies an abnormal interval signal to the output control section 43, upon which the procedure goes to step S34.

If the number of bytes of the data in the section of the packet interval found not greater than threshold value th is found to be smaller than 188 bytes in step S32, then the packet interval monitor section 42 recognizes that the packet interval is abnormal interval because of a too short packet interval and supplies an abnormal interval signal to the output control section 43, upon which the procedure goes to step S34.

In step S34, the output control section 43 executes substantially the same processing of step S24 shown in FIG. 7.

To be more specific, in step S34, in accordance with the abnormal interval signal supplied from the packet interval monitor section 42, the output control section 43 discards the data in the abnormal section in the adjusted TS outputted from the rate adjustment section 41.

Further, in step S34, at the start flag supplied from the rate adjustment section 41, the output control section 43 changes H-level portion indicative of the beginning of the TS packet to L level and outputs the start flag after the change to the decoder 22.

Also, the output control section 43 changes the level of the abnormal section of the valid flag supplied from the rate adjustment section 41 to L level and outputs the changed valid flag to the decoder 22, upon which the procedure returns from step S34 to step S31 to repeat the above-mentioned processing therefrom.

As described above, in the packet output processing shown in FIG. 8, if the packet interval is not greater than threshold th and the number of bytes of the data of that packet interval is less than 188, it is recognizes that the packet interval is an abnormal interval because the packet interval is too short and the TS packets in that abnormal packet interval are discarded. Further, if the packet interval is greater than threshold value th, it is recognized that the packet interval is an abnormal interval because the packet interval is too long and the TS packets of that abnormal interval are discarded. Then, if the packet interval becomes normal after the discarding of the TS packets starts, the procedure returns to the processing for outputting the (normal) TS packets to the decoder 22.

According to the packet output processing shown in FIG. 8, only monitoring the packet interval by the start flag and only monitoring the number of bytes of the data in the section of the packet interval in the adjusted TS as required can easily prevent the decoder 22 and so on from getting in an abnormal state by giving the TS packets of abnormal length to the decoder 22.

It should be noted that, in FIG. 8, the processing operations of steps S31 and S32 correspond to the packet interval decision processing of step S11 shown in FIG. 5 and the processing operation of step S34 corresponds to the output control processing of step S13 shown in FIG. 5.

For threshold value th, the specified interval or upper threshold th1 described with reference to FIG. 7 may be used. Further, like upper threshold value th1 and lower threshold value th2 described with reference to FIG. 7, threshold value th may be set in accordance with the broadcasting in which broadcast signals are received by the receiving system shown in FIG. 1, may be set for each channel, and may be set and adjusted in accordance with user operations.

<Second Exemplary Configuration of the Output Control Section 43>

Figure 9:
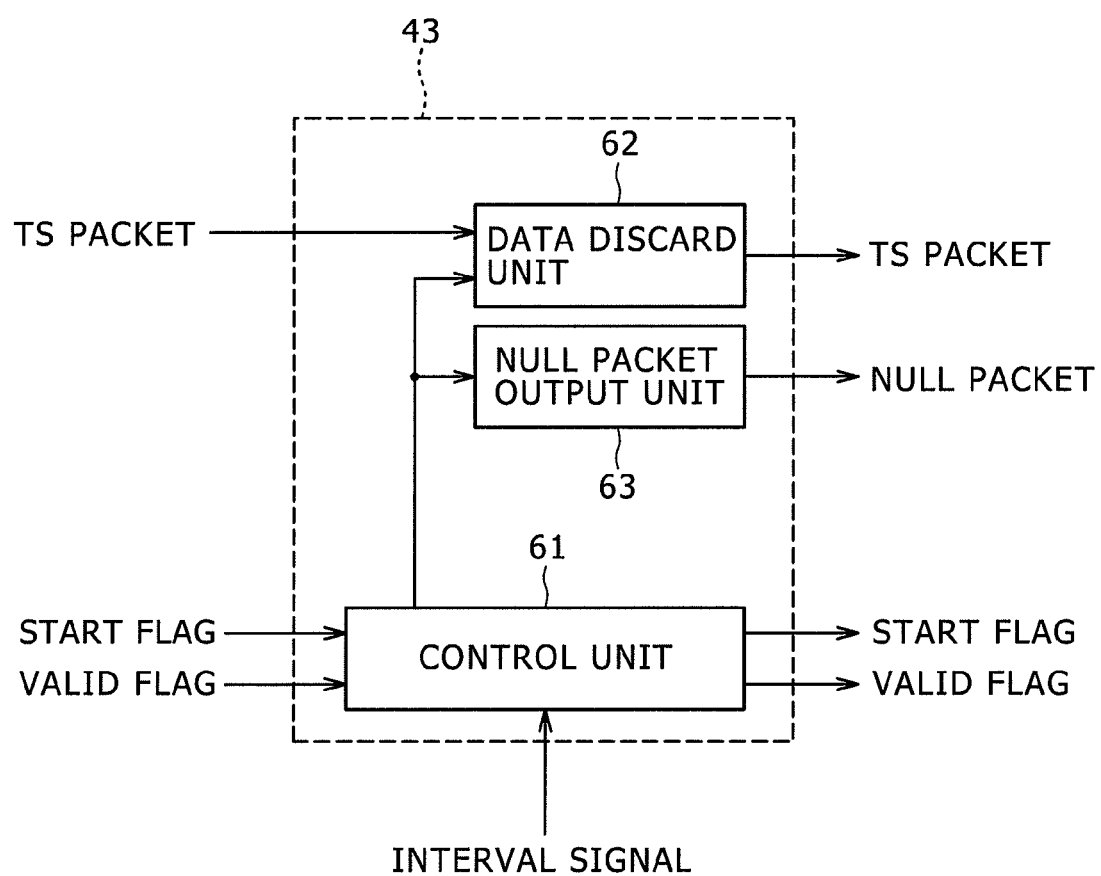
FIG. 9 is a block diagram illustrating a second exemplary configuration of the output control section.

FIG. 9 shows the second exemplary configuration of the output control section 43 shown in FIG. 1.

It should be noted that portions corresponding to those shown in FIG. 6 are denoted by the same reference numerals and the description thereof is skipped as appropriate.

In FIG. 9, an output control block 43 is common to the case shown in FIG. 6 in having a control unit 61 and a data discard block 62 but different from the case shown in FIG. 6 in further having a null packet output unit 63.

It should be note that, as with the case shown in FIG. 6, the control unit 61 also controls the null packet output unit 63 in addition to controlling the data discard block 62 in accordance with an interval signal supplied from the packet interval monitor section 42.

The null packet output unit 63 outputs a null packet to a decoder 22 under the control of the control unit 61.

It should be noted that the null packet specified by MPEG is a packet with the first four bytes of TS packet being 0x47, 0x1F, 0xFF, and 0x1F; for the payload bits, all "1" is employed for example.

<Fourth Embodiment of Packet Output Processing by the Rate Adjusting Buffer Block 35>

Figure 10:
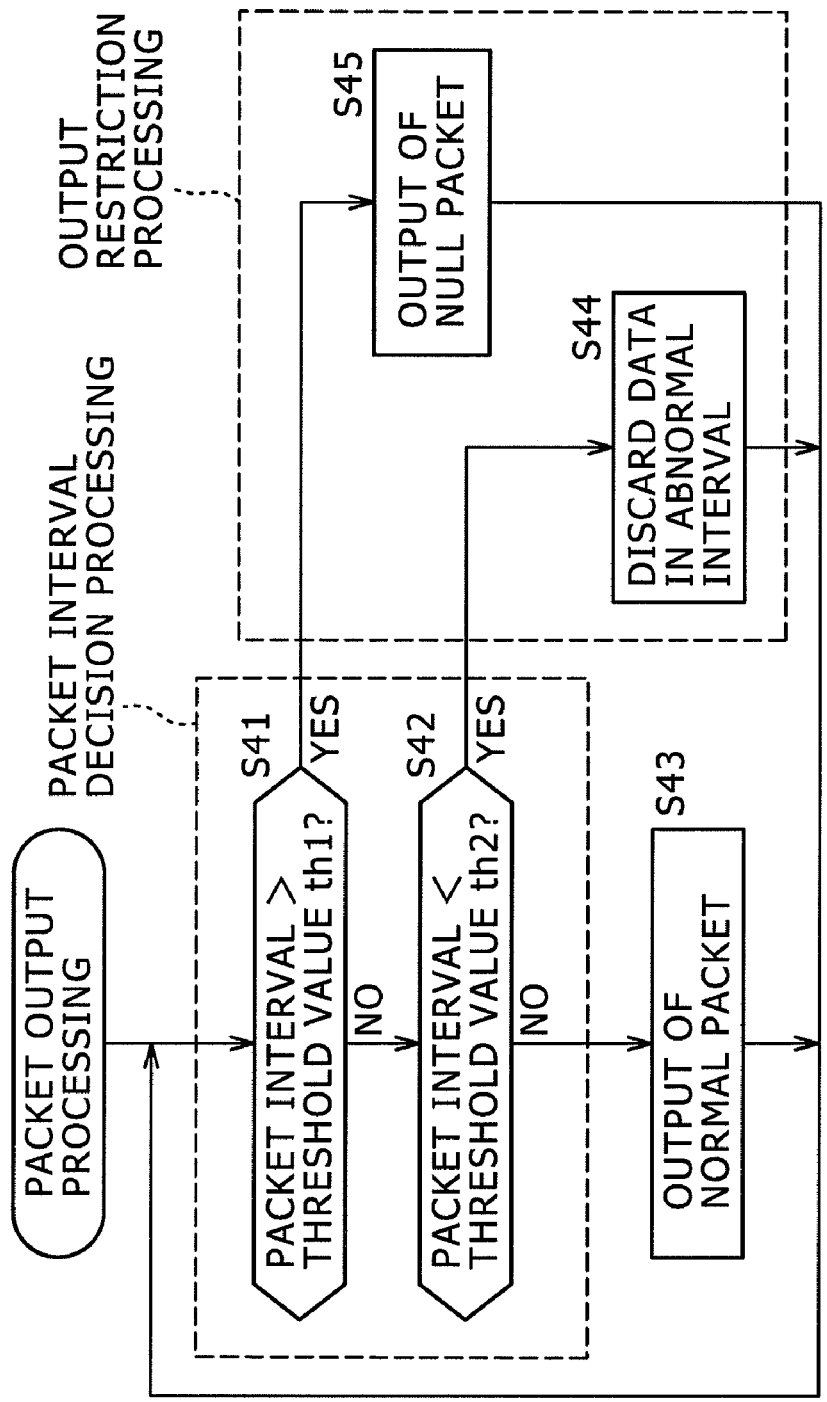
FIG. 10 is a flowchart indicative of a fourth embodiment of packet output processing by the rate adjusting buffer block.

Referring to FIG. 10, the following describes one embodiment (the fourth embodiment of packet output processing) of the packet output processing by the rate adjusting buffer block 35 to be executed when the output control block 43 is configured as shown in FIG. 9.

The rate adjustment section 41 outputs an adjusted TS, a start flag, and a valid flag as described with reference to FIG. 5. The adjusted TS, the start flag, and the valid flag outputted by the rate adjustment section 41 are supplied to the output control section 43. Further, the start flag outputted by the rate adjustment section 41 is also supplied to the packet interval monitor section 42.

Further, the packet interval monitor section 42 also monitors the adjusted TS for packet interval on the basis of the start flag supplied from the rate adjustment section 41 as described with reference to FIG. 5.

Then, in step S41, the packet interval monitor section 42 determines whether the packet interval is greater than upper threshold value th1 in the same manner as in step S21 shown in FIG. 7.

If the packet interval is found not to be greater than upper threshold value th1 in step S41, then the procedure goes to step S42, in which the packet interval monitor section 42 determines whether the packet interval is smaller than lower threshold value th2 in the same manner as in step S22 shown in FIG. 7.

If the packet interval is found not to be smaller than lower threshold th2 in step S42, the packet interval monitor section 42 recognizes that the packet interval is a normal interval and supplies a normal interval signal to the output control section 43, upon which the procedure goes to step S43.

In step S43, as with step S23 shown in FIG. 7, the output control section 43 outputs the TS packets in the section of the normal packet interval of the adjusted TS and the start flag and the valid flag of that section to the decoder 22 (FIG. 1) without change.

Then, the procedure returns from step S43 to step S41 to repeat the above-mentioned processing therefrom.

If the packet interval is found to be smaller than lower threshold value th2 in step S42, then the packet interval monitor section 42 recognizes that the packet interval is an abnormal interval because the packet interval is too short and supplies an abnormal interval signal to the output control section 43, upon which the procedure goes to step S44.

In step S44, the output control section 43 discards the data of the abnormal section in the adjusted TS outputted from the rate adjustment section 41 in accordance with the abnormal interval signal supplied from the packet interval monitor section 42 in the same manner as in step S24 shown in FIG. 7.

Further, in step S44, at the start flag supplied from the rate adjustment section 41, the output control section 43 changes the H-level portion indicative of the beginning of the TS packet to L level and outputs the changed start flag to the decoder 22.

Also, the output control section 43 changes the level of the abnormal section of the valid flag supplied from the rate adjustment section 41 to L level and outputs the changed valid flag to the decoder 22, upon which the procedure returns from step S44 to step S41 to repeat the above-mentioned processing therefrom.

On the other hand, if the packet interval is found to be greater than upper threshold value th1 in step S41, then the packet interval monitor section 42 recognizes the packet interval is abnormal because the packet interval is too long and supplies an abnormal interval signal to the output control section 43, upon which the procedure goes to step S45.

In step S45, in accordance with the abnormal interval signal supplied from the packet interval monitor section 42, the output control section 43 outputs the null packet to the decoder 22 instead of the data of the abnormal section in the adjusted TS outputted from the rate adjustment section 41. Namely, in the output control section 43, the control unit 61 (FIG. 9) controls the null packet output unit 63 in accordance with the abnormal interval signal supplied from the packet interval monitor section 42, thereby outputting the null packet to the decoder 22.

Further, in step S45, as with the case of step S44, at the start flag supplied from the rate adjustment section 41, the output control section 43 changes the H-level portion indicative of the TS packet in the abnormal section to L level and outputs the changed start flag to the decoder 22.

Also, as with the case of step S44, the output control section 43 changes the H-level portion indicative of the abnormal section of the valid flag supplied from the rate adjustment section 41 to L level and outputs the changed valid flag to the decoder 22, upon which the procedure returns from step S45 to step S41 to repeat the above-mentioned processing therefrom.

According to the packet output processing shown in FIG. 10, only monitoring the packet interval by the start flag can easily prevent the decoder 22 and so on from getting in an abnormal state by giving the TS packets having an abnormal length to the decoder 22.

It should be noted that, in FIG. 10, the processing operations of steps S41 and S42 correspond to the packet interval decision processing of step S11 shown in FIG. 5 and the processing operations of steps S44 and S45 correspond to the output restriction processing of step S13 shown in FIG. 5.

It should be noted that, if the output control section 43 outputs the null packet instead of the data of the abnormal section in the adjusted TS, no special problem is caused if an undamaged PTS is included in that data of the abnormal section.

<Fifth Embodiment of Packet Output Processing by the Rate Adjusting Buffer Block 35>

Figure 11:
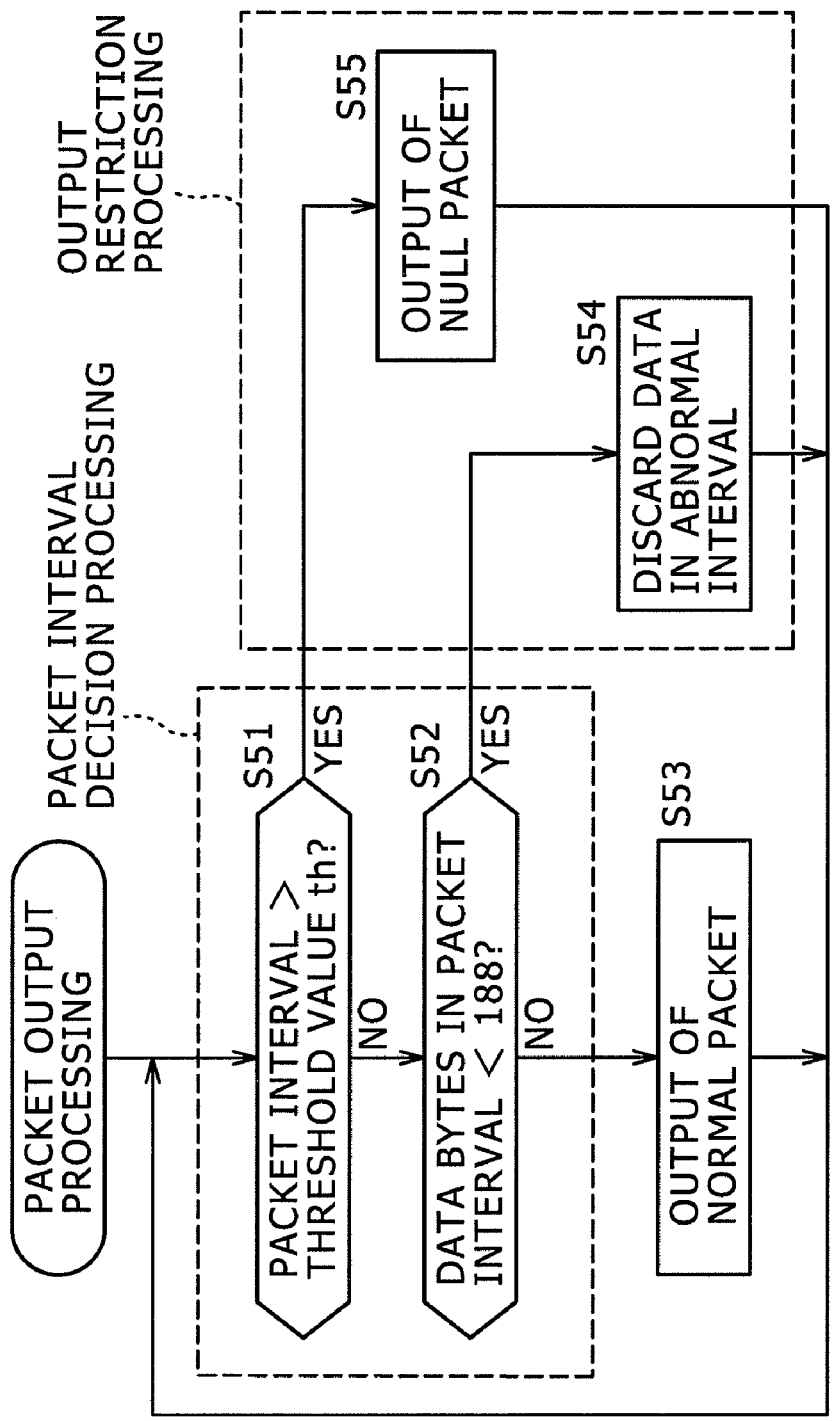
FIG. 11 is a flowchart indicative of a fifth embodiment of packet output processing by the rate adjusting buffer block.

Referring to FIG. 11, the following describes another embodiment (the fifth embodiment of the packet output processing) of the packet output processing by the rate adjusting buffer block 35 to be executed when the output control section 43 is configured as shown in FIG. 9.

As described with reference to FIG. 5, the rate adjustment section 41 outputs an adjusted TS, a start flag, and a valid flag. The adjusted TS, the start flag, and the valid flag outputted by the rate adjustment section 41 are supplied to the output control section 43. Further, the start flag outputted by the rate adjustment section 41 is also supplied to the packet interval monitor section 42.

Further, as described above with reference to FIG. 5, the packet interval monitor section 42 also monitors the adjusted TS for packet interval on the basis of the start flag supplied from the rate adjustment section 41.

Then, in step S51, the packet interval monitor section 42 determines whether the packet interval is greater than threshold value th in the same manner as in step S31 shown in FIG. 8.

If the packet interval is found not to be greater than threshold value th in step S51, then the procedure goes to step S52, in which the packet interval monitor section 42 determines whether the number of bytes of the data in the section of the packet interval in which the packet interval is found not to be greater than threshold value th is smaller than 188 bytes that are the size of the TS packet in the same manner as in step S32 shown in FIG. 8.

If the number of bytes of the data in the section of the packet interval determined to be not greater than threshold value th is determined to be smaller than 188 bytes in step S52, then the packet interval monitor section 42 recognizes that the packet interval determined to be not greater than threshold value th is normal and supplies a normal interval signal to the output control section 43, upon which the procedure goes to step S53.

In step S53, as with step S23 shown in FIG. 7, in accordance with the normal interval signal supplied from the packet interval monitor section 42, the output control section 43 outputs the TS packets in the section of the normal packet interval and the start flag and the valid flag of that section of the adjusted TS outputted from the rate adjustment section 41 to the decoder 22 (FIG. 1).

Then, the procedure returns from step S53 to step S51 to repeat the above-mentioned processing therefrom.

If the number of bytes of the data in the section of the packet interval determined to be not greater than threshold value th is determined less than 188 bytes in step S52, then the packet interval monitor section 42 recognizes an abnormal interval because the packet interval is too short and supplies an abnormal interval signal to the output control section 43, upon which the procedure goes to step S54.

In step S54, the output control section 43 executes the same processing as in step S24 shown in FIG. 7.

To be more specific, in step S54, in accordance with the abnormal interval signal supplied from the packet interval monitor section 42, the output control section 43 discards the data in the abnormal section in the adjusted TS outputted from the rate adjustment section 41.

Further, in step S54, the rate adjustment section 41 changes the H-level portion indicative of the beginning of the TS packet in the abnormal interval to L level and outputs the changed start flag to the decoder 22.

Also, the output control section 43 changes the level of the abnormal interval of the valid flag supplied from the rate adjustment section 41 to L level and outputs the changed valid flag to the decoder 22, upon which the procedure returns from step S54 to step S51 to repeat the above-mentioned processing therefrom.

On the other hand, if the packet interval is found to be greater than threshold value th in step S51, then the packet interval monitor section 42 recognizes that the interval is abnormal because the packet interval is too long and supplies an abnormal interval signal to the output control section 43, upon which the procedure goes to step S55.

In step S55, as with step S45 shown in FIG. 10, in accordance with the abnormal interval signal supplied from the packet interval monitor section 42, the output control section 43 outputs the null packet to the decoder 22 instead of the data of the abnormal interval in the adjusted TS outputted from the rate adjustment section 41.

Further, in step S55, at the start flag supplied from the rate adjustment section 41, the output control section 43 changes the H-level portion indicative of the beginning of the TS packet in the abnormal section to L level and outputs the changed start flag to the decoder 22.

Also, the output control section 43 changes the level of the abnormal section of the valid flag supplied from the rate adjustment section 41 to L level and outputs the changed valid flag to the decoder 22, upon which the procedure returns from step S55 to step S51 to repeat the above-mentioned processing therefrom.

As described above, in the packet output processing shown in FIG. 11, if the packet interval is not greater than threshold value th and the number of bytes of the data of that packet interval is smaller than 188, it is recognized that the interval is abnormal because the packet interval is too short and the TS packets of that abnormal interval are discarded. If the packet interval is greater than threshold value th, it is recognized that the interval is abnormal because the packet interval is too long, and the null packet is outputted to the decoder 22 instead of the TS packets of that abnormal interval. Then, after the discarding of the TS packets starts or the outputting of the null packet starts, the processing is resumed to output (normal) TS packets to the decoder 22 when the packet interval becomes normal.

According to the packet output processing shown in FIG. 11, only monitoring the packet interval by the start flag and only monitoring the number of types of the data in the section of the packet interval in the adjusted TS as required can easily prevent the decoder 22 and so on from getting in an abnormal state by giving the TS packets of an abnormal length to the decoder 22.

It should be noted that, in FIG. 11, the processing operations of steps S51 and S52 correspond to the packet interval decision processing of step S11 shown in FIG. 5 and the processing operations of steps S54 and S55 correspond to the output restriction processing of step S13 shown in FIG. 5.

The above-mentioned sequence of processing operations may be executed by software as well as hardware. When the above-mentioned sequence of processing operations is executed by software, the programs constituting the software are installed in a computer which is built in dedicated hardware equipment or installed, from a network or recording media, into a general-purpose personal computer for example in which various programs may be installed for the execution of various functions.

Figure 12:
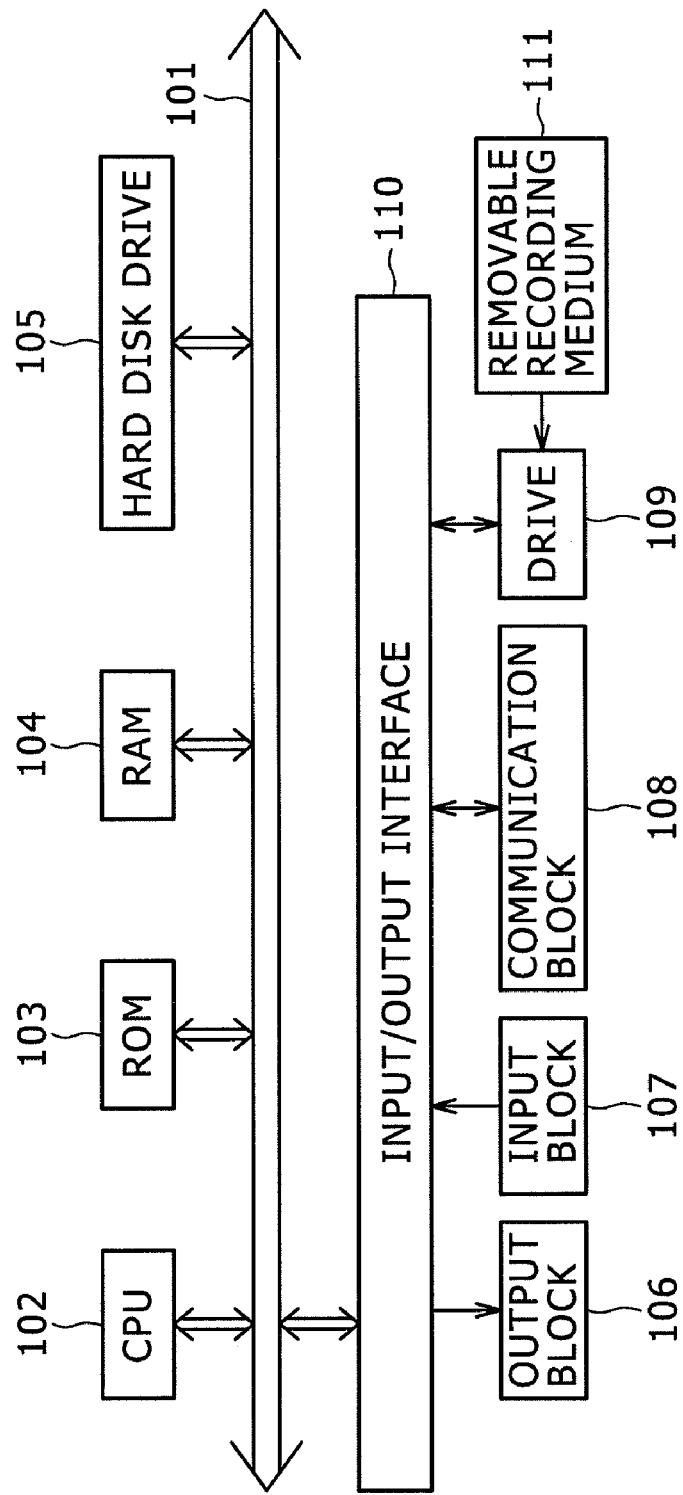
FIG. 12 is a block diagram illustrating an exemplary configuration of a computer practiced as one embodiment of the invention.

So, FIG. 12 shows an exemplary configuration of a computer as one embodiment of the invention in which programs for executing the above-mentioned sequence of processing operations are installed.

Each program is may be stored in a hard disc drive 105 or a ROM 103 that are recording media incorporated in the computer.

Alternatively, each program may be temporarily or permanently stored (recorded) in a removable recording media 111, such as a flexible disc, a CD-ROM (Compact Disc Read Only Memory), an MO (Magneto Optical) disc, a DVD (Digital Versatile Disc), a magnetic disc, or a semiconductor memory. The removable recording media 111 may be provided as so-called package software.

It should be noted that, in addition to the installation from removable recording media 111 such as mentioned above into a computer, programs may be downloaded from a download site into a computer in a wireless manner via a satellite for digital satellite broadcasting or via a network such as LAN (Local Area Network) or the Internet in a wired manner. The computer receives downloaded programs by a communication block 108 and records them into the incorporated hard disc drive 105.

The computer incorporates a CPU (Central Processing Unit) 102. The CPU 102 is connected with an input/output interface 110 via a bus 101. When a command is entered by a user via the input/output interface 110 by operating an input block 107 made up of a keyboard, a mouse, a microphone, and so on, the CPU 102 accordingly executes a program stored in the ROM (Read Only Memory) 103. Alternatively, the CPU 102 loads a program stored in the hard disc drive 105, a program downloaded from a satellite or a network, received by the communication block 108 and installed in the hard disk drive 105, or a program installed in the hard disc drive 105 as read from the removable recording media 111 loaded on a drive 109 into a RAM (Random Access Memory) 104 and executes the loaded program. Consequently, the CPU 102 executes the processing according to the above-mentioned flowcharts or the processing to be executed by the above-mentioned configurations shown in the block diagrams. Then, the CPU 102 outputs results of the processing from an output block 106 made up of an LCD (Liquid Crystal Display), a loudspeaker, and so on, transmits the results from the communication block 108, or records the results to the hard disc drive 105 via the input/output interface 110, for example.

It should be noted herein that the steps for describing each program recorded in recording media include not only the processing operations which are sequentially executed in a time-dependent manner but also the processing operations which are executed concurrently or discretely (for example parallel processing or object processing).

It should also be noted that each program may be executed by one unit of computer or two or more units of computers in a distributed manner. In addition, each program may be transmitted to a remote computer for execution.

It should be noted that, while preferred embodiments of the present invention have been described using specific terms, such description is for illustrative purpose, and it is to be understood that changes and variations may be made without departing from the spirit or scope of the following claims.

Namely, for example, in the rate adjusting buffer block 35, the PTS in the adjusted TS is also monitored in addition to the packet interval. In each of the cases where an abnormal packet interval has been detected and an abnormal PTS has been detected, the TS packets may be discarded or the null packet may be outputted to the decoder 22.

As described above, if both the packet interval and the PTS are monitored, both problems may be prevented in which the decoder 22 gets in an abnormal state due to the abnormal TS packets having a length not compliant with the standard and the decoder 22 gets in an abnormal state due to the TS packets of the abnormal PTS.

Whether to discard data or output the null packet when the packet interval is abnormal may be determined on the basis of the specifications (for example, the compatibility of the decoder 22 with the null packet), for example.

Further, the receiving system shown in FIG. 1 is applicable to television receivers configured to receive programs of satellite broadcasting or other broadcasting and apparatuses configured to receive programs of IPTV (Internet Protocol TV) and so on that are transmitted via a network, such as the Internet.

The present application contains subject matter related to that disclosed in Japanese Priority Patent Application JP 2008-247901 filed in the Japan Patent Office on Sep. 26, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A data processing apparatus comprising:
    adjusting means for receiving a stream including packets and a start flag indicative of the beginning of each of said packets in said stream, adjusting a rate of said stream to a certain rate, and outputting the adjusted stream that is said stream after the rate adjustment and said start flag indicative of the beginning of each of said packets in said adjusted stream;
    monitoring means for monitoring a packet interval that is a start interval between said packets in said adjusted stream on the basis of said start flag; and
    output control means for executing output control of outputting said packets in said adjusted stream if said packet interval is a normal interval and restricting the outputting of said packets in said adjusted stream if said packet interval is an abnormal interval,
    wherein, if said packet interval is a relatively short internal as an abnormal interval, said output control means discards data of a portion of said abnormal interval in said adjusted stream and, if said packet interval is a relatively long interval as an abnormal interval, said output control means outputs a null packet as a packet for a portion of said abnormal interval.

2. The data processing apparatus according to claim 1, wherein, if said packet interval is an abnormal interval, said output control means discards data of a portion of said abnormal interval in said adjusted stream.

3. The data processing apparatus according to claim 1, wherein, if said packet interval is an abnormal interval, said output control means outputs a null packet as a packet for a portion of said abnormal interval.

4. A data processing method for a data processing apparatus that receives a stream including packets and a start flag indicative of the beginning of each of said packets in said stream in order to process said stream, comprising the steps of:
    adjusting a rate of said stream to a certain rate and outputting the adjusted stream that is said stream after the rate adjustment and said start flag indicative of the beginning of each of said packets in said adjusted stream;
    monitoring a packet interval that is a start interval between said packets in said adjusted stream on the basis of said start flag;
    executing output control of outputting said packets in said adjusted stream if said packet interval is a normal interval and restricting the outputting of said packets in said adjusted stream if said packet interval is an abnormal interval;

if said packet interval is a relatively short interval as an abnormal interval, discarding data of a portion of said abnormal interval in said adjusted steam; and if said packet interval is a relatively long interval as an abnormal interval, outputting a null packet as a packet for portion of said abnormal interval.

5. A data processing apparatus comprising:

adjusting means for receiving a stream including packets and a start flag indicative of the beginning of each of said packets in said stream, adjusting a rate of said stream to a certain rate, and outputting the adjusted stream that is said stream after the rate adjustment and said start flag indicative of the beginning of each of said packets in said adjusted stream;

monitoring means for monitoring a packet interval that is a start interval between said packets in said adjusted stream on the basis of said start flag;

output control means for executing output control of outputting said packets in said adjusted stream if said packet interval is a normal interval and restricting the outputting of said packets in said adjusted stream if said packet interval is an abnormal interval; and decoding means for decoding said packets outputted as a result of said output control, wherein, if said packet interval is a relatively short interval as an abnormal interval, said output control means discards data of a portion of said abnormal interval in said adjusted stream and, if said packet interval is a relatively long interval as an abnormal interval, said output control means outputs a null packet as a packet for a portion of said abnormal interval.

6. The data processing apparatus according to claim 5, wherein, if said packet interval is an abnormal interval, said output control means discards data of a portion of said abnormal interval in said adjusted stream.

7. The data processing apparatus according to claim 6, wherein, if said packet interval is an abnormal interval, said output control means outputs a null packet as a packet for a portion of said abnormal interval.

8. A data processing method for a data processing apparatus that receives a stream including packets and a start flag indicative of the beginning of each of said packets in said stream in order to process said stream, comprising the steps of:

adjusting a rate of said stream to a certain rate and outputting the adjusted stream that is said stream after the rate adjustment and said start flag indicative of the beginning of each of said packets in said adjusted stream;

monitoring a packet interval that is a start interval between said packets in said adjusted stream on the basis of said start flag;

executing output control of outputting said packets in said adjusted stream if said packet interval is a normal interval and restricting the outputting of said packets in said adjusted stream if said packet interval is an abnormal interval;

if said packet interval is a relatively short interval as an abnormal interval, discarding data of a portion of said abnormal interval in said adjusted steam;

if said packet interval is a relatively long interval as an abnormal interval, outputting a null packet as a packet for portion of said abnormal interval; and decoding said packets outputted as a result of said output control.

9. A data processing apparatus comprising:

an adjusting section configured to receive a stream including packets and a start flag indicative of the beginning of each of said packets in said stream, adjust a rate of said stream to a certain rate, and output the adjusted stream that is said stream after the rate adjustment and said start flag indicative of the beginning of each of said packets in said adjusted stream;

a monitoring section configured to monitor a packet interval that is a start interval between said packets in said adjusted stream on the basis of said start flag; and an output control section configured to execute output control of outputting said packets in said adjusted stream if said packet interval is a normal interval and restricting the outputting of said packets in said adjusted stream if said packet interval is an abnormal interval, wherein, if said packet interval is a relatively short interval as an abnormal interval, said output control means discards data of a portion of said abnormal interval in said adjusted stream and, if said packet interval is a relatively long interval as an abnormal interval, said output control means outputs a null packet as a packet for a portion of said abnormal interval.

10. A data processing apparatus comprising:

an adjusting section configured to receive a stream including packets and a start flag indicative of the beginning of each of said packets in said stream, adjust a rate of said stream to a certain rate, and output the adjusted stream that is said stream after the rate adjustment and said start flag indicative of the beginning of each of said packets in said adjusted stream;

a monitoring section configured to monitor a packet interval that is a start interval between said packets in said adjusted stream on the basis of said start flag;

an output control section configured to execute output control of outputting said packets in said adjusted stream if said packet interval is a normal interval and restricting the outputting of said packets in said adjusted stream if said packet interval is an abnormal interval; and a decoding section configured to decode said packets outputted as a result of said output control, wherein, if said packet interval is a relatively short interval as an abnormal interval, said output control means discards data of a portion of said abnormal interval in said adjusted stream and, if said packet interval is a relatively long interval as an abnormal interval, said output control means outputs a null packet as a packet for a portion of said abnormal interval.

* * * * *